US006834215B1

(12) United States Patent
Ostwald

(10) Patent No.: US 6,834,215 B1
(45) Date of Patent: Dec. 21, 2004

(54) MASS LOAD METHOD AND APPARATUS FOR A DATA STORAGE LIBRARY

(75) Inventor: Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/635,885

(22) Filed: Aug. 6, 2003

(51) Int. Cl.[7] .............................................. G06F 7/00
(52) U.S. Cl. .................. 700/214; 414/273; 414/277; 414/807; 369/75.1; 369/178.01
(58) Field of Search ................... 700/213, 214; 414/266, 273, 277, 807; 369/75.1, 178.01

(56) References Cited

U.S. PATENT DOCUMENTS

| | | | |
|---|---|---|---|
| 3,955,322 A | | 5/1976 | Call, Jr. .......................... 49/40 |
| 4,577,562 A | | 3/1986 | Berman ...................... 109/24.1 |
| 4,603,643 A | | 8/1986 | Couvrette .................. 109/24.1 |
| 4,681,044 A | | 7/1987 | Dallman ..................... 109/24.1 |
| 4,792,270 A | | 12/1988 | Yoshida ....................... 414/273 |
| 4,856,437 A | | 8/1989 | Trucksess .................. 109/24.1 |
| 4,958,976 A | | 9/1990 | Haueter ....................... 414/331 |
| 5,128,912 A | * | 7/1992 | Hug et al. ............... 369/30.61 |
| 5,449,229 A | | 9/1995 | Aschenbrenner et al. ... 312/283 |
| 5,546,315 A | | 8/1996 | Kleinschnitz ............ 364/47.06 |
| 5,914,919 A | * | 6/1999 | Fosler et al. ............. 369/30.31 |
| 5,999,356 A | | 12/1999 | Dimitri et al. ................. 360/71 |
| 6,085,123 A | | 7/2000 | Baca et al. .................. 700/214 |
| 6,088,189 A | | 7/2000 | Utsumi et al. ................ 360/92 |
| 6,130,800 A | | 10/2000 | Ostwald ....................... 360/92 |
| 6,229,667 B1 | | 5/2001 | Ostwald ....................... 360/92 |
| 6,347,020 B1 | | 2/2002 | Carpenter et al. ............ 360/92 |
| 6,409,450 B1 | | 6/2002 | Ostwald et al. ............. 414/277 |
| 6,499,928 B2 | | 12/2002 | Ostwald et al. ............. 414/277 |
| 6,591,164 B1 | * | 7/2003 | Plutt et al. .................. 700/245 |
| 6,614,619 B1 | * | 9/2003 | Satoh .......................... 360/92 |

FOREIGN PATENT DOCUMENTS

JP          04089702 A     3/1992    ............ B65G/1/00

* cited by examiner

Primary Examiner—Khoi H. Tran
(74) Attorney, Agent, or Firm—Yee & Associates, P.C.

(57) ABSTRACT

A data storage library is disclosed that provides a variable sized load/unload area within the library. The data storage library includes a housing defining an exterior and an interior region, storage slots disposed in the interior region for storing data cartridges, a barrier door, a front door, and a controller. The barrier door has a closed position for dividing the interior region into a first interior region and a second interior region. Thus, the interior region is divided into two regions when the barrier door is closed. The controller closes the barrier door prior to the front door being opened, and opens the barrier door after the front door is closed. Thus, access is permitted to only the first interior region from the exterior region when the front door is opened. The first interior region is sized to permit a user to entirely physically enter the first interior region.

18 Claims, 5 Drawing Sheets

MASS LOAD METHOD AND APPARATUS FOR A DATA STORAGE LIBRARY

BACKGROUND OF THE INVENTION

1. Field of the Invention

The present invention relates generally to data storage libraries and particularly to a method and apparatus for mass loading and unloading of data cartridges in a data storage library. Still more particularly, the present invention relates to a data storage library that includes a walk-in customer access port that may be accessed by a user while the remainder of the library remains on-line and secure.

2. Background of the Invention

Automated data storage libraries incorporate one or more robotic mechanisms for moving data cartridges around within the library. From time to time, these robotic mechanisms require maintenance actions. Maintenance is usually performed through a service door in the library's housing that allows personnel to access robotic mechanisms inside the library. Everything within the library, including all of the robotic mechanisms and tape drives, are shut down any time the service door is open. This shut down is done for the safety of the personnel performing the maintenance on the robots.

The approach of shutting down the robotic mechanisms during maintenance is costly to the automated data storage library owner in terms of down time of the library and security for the data within. The library can perform no useful work while the service door is open and all of the robots are shut down. Even if maintenance is required on only one robotic mechanism, the other robots must be stopped in order to avoid possible collisions with the personnel. This means that no new data cartridges can be mounted into the read/write drives, and data cartridges currently in the read/write drives cannot be dismounted during maintenance operations.

In the prior art, there is a problem with permitting users access to a data storage library to easily load and unload large quantities of data cartridges into slots of a data storage library. Access to the library has been permitted by taking the library offline while the user accesses the slots in the library.

Therefore, the current technology would be improved by a data storage library that includes a walk-in portion that may be accessed by a user while the remainder of the library remains on-line, secure, and accessible to a robot that may continue to operate while a user is in the walk-in portion in order to permit loading and unloading of large quantities of tape cartridges.

SUMMARY OF THE INVENTION

A data storage library is disclosed that provides a variable sized load/unload area within the library. The data storage library includes a housing defining an exterior and an interior region, storage slots disposed in the interior region for storing data cartridges, at least one barrier door, at least one front door, and a controller. The barrier door has a closed position for dividing the interior region into a first interior region and a second interior region. Thus, the interior region is divided into two regions when the barrier door is closed. The controller closes the barrier door prior to the front door being opened, and opens the barrier door only after the front door is closed. Thus, access is permitted to only the first interior region from the exterior region when the front door is opened. The first interior region is sized to permit a user to entirely physically enter the first interior region.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is a mass load method and apparatus for a data storage library. The data storage library includes a housing that has an interior region that is secured from its exterior region by a front door. Within the interior region are a plurality of storage slots that may be used to store data cartridges. The interior region of the housing may be divided into a first region and a second region by a barrier door when the barrier door is closed. A large first number of the storage slots will be located in the first region and a second number of the storage slots will be located in the second region when the barrier door is closed.

The barrier door is closed prior to the front door being opened. When the front door is open and the barrier door is closed, the first region is accessible to a user as a customer access port. A user may fully enter the first region. Thus, the first region is sized to permit an entire human body to enter the first region.

While the front door is opened and the barrier door is closed, the data storage library remains online. The robot is located in the second region while the front door is opened and the barrier door is closed. Thus, the robot may continue to access the second number of slots in the second region while a user is physically within the first region accessing the first number of slots.

Figure 1:
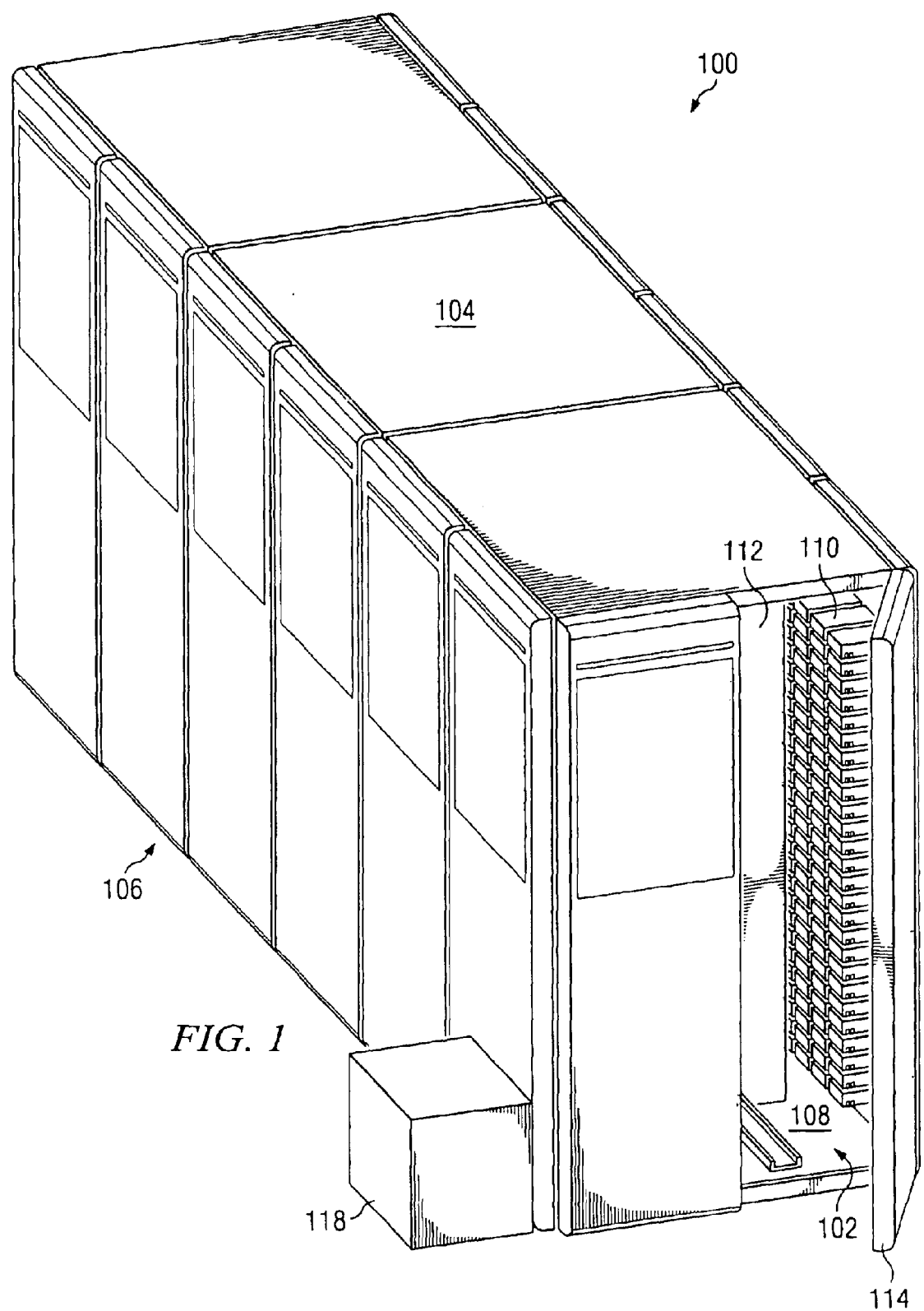
FIG. 1 is a perspective view that depicts a data storage library having its front door opened and barrier door closed in accordance with the present invention.

FIG. 1 is a perspective view that depicts a data storage library 100 in accordance with the present invention. Data storage library 100 provides a variable sized load/unload area 102 within library 100. Data storage library 100 includes a housing 104 that defines an exterior region 106 and an interior region 108. Storage slots 110 are disposed in interior region 108 for storing data cartridges. Data storage library 100 also includes a barrier door 112 (shown in its closed position), a front door 114, and a controller 118.

The barrier door may be a sliding, rotating, louvered, bifold, telescoping, tambour, or any other type of door.

Data storage library 100 includes a plurality of slots 110 with library 100. Each slot may be used to store a single data cartridge. A robot (shown in FIGS. 2–5) is included within library 100. When library 100 is online, the robot may move within the interior 108 of the library in order to access and/or move various data cartridges without user involvement. The robot may move within interior region from one end toward another until it meets a barrier. When barrier door 112 is opened, the robot will continue to move until it meets front door 114. When barrier door 112 is closed, the robot will continue to move until it meets barrier door 112.

Library 100 includes a front door 114 which may be opened to permit access from exterior region 106 into interior region 108. Slots 110 are stationary and fixed within library 100.

Figure 2:
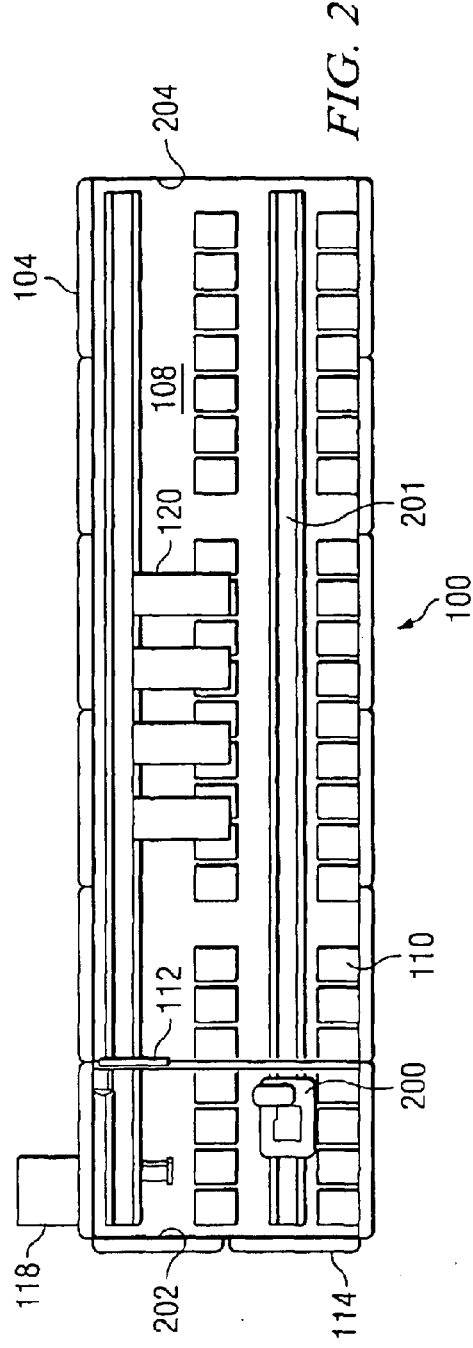
FIG. 2 is a top view of the data storage library of FIG. 1 having a barrier door in the opened position in accordance with the present invention.

FIG. 2 depicts a top view of the data storage library of FIG. 1 having a barrier door 112 in the opened position in accordance with the present invention. Library 100 includes a front door 114 that may be opened in order to permit access to the library's slots 110.

Library 100 consists of a plurality of storage slots 110 mounted in an interior region 108 of housing 104. One or more robotic mechanisms, such as robot 200, operate within interior housing in order to move the data cartridges about within library 100. Tape drives 120 are included within library 100 in order to read the various data cartridges.

Library control unit 118 provides control and coordination of robot 200 as well as opening and closing of the front 114 and barrier 112 doors as well as the adjustment of the barrier door 112 from one end of interior region 108 to the other. Barrier door 112 may be moved when it is in the opened position within interior region 108 from one location to another.

When library 100 is online with the front door 114 closed and barrier door 112 opened, robot 200 moves back and forth along guide track 201 within library 100 from one end 202 of interior region 108 to the other end 204 while slots 110 remain stationary. All slots 110 may be accessed by robot 200 when front door 114 is closed and barrier door 112 is opened.

Figure 3:
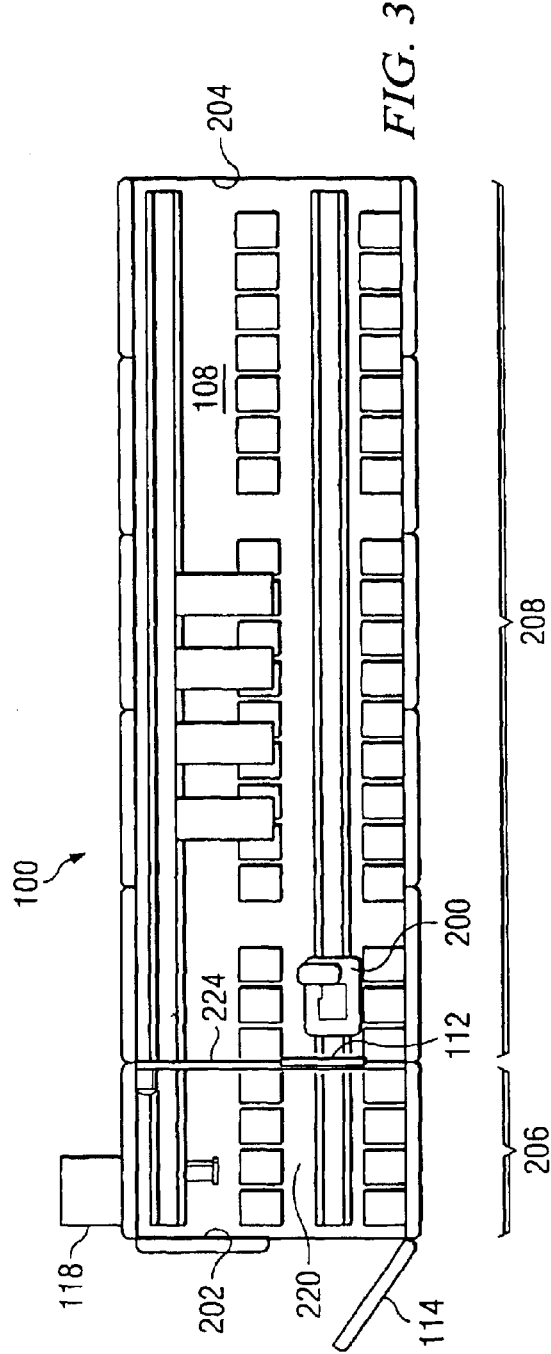
FIG. 3 is a top view of the data storage library of FIG. 1 having a barrier door in the closed position to define a load/unload area of a first size in accordance with the present invention.

FIG. 3 illustrates a top view of the data storage library 100 of FIG. 1 having barrier door 112 in the closed position to define a load/unload area of a first size in accordance with the present invention. When barrier door 112 is closed, a load/unload area 220 is defined between one end 202 of library 100 and barrier door 112. Thus, barrier door 112 divides interior region 108 into a first region 206 and a second region 208. First region 206 is an area 220 that may be used by a person to load and unload data cartridges from the slots that are included in area 220. A large number of slots are included in area 220 so that a user may load and/or unload a large number of slots at one time. First region 206 is large enough to permit a human being to entirely enter first region 206.

The size of load/unload area 220, and thus first region 206, may be specified by a user or may be a predefined default size. When barrier door 112 is closed, robot 200 may move within second region 208 of library 100 between a new end 224 defined by barrier door 112 and end 204.

When a person wishes to enter library 100, a user enters a command using controller 118 to open front door 114. In response to a receipt of this command, controller 118 causes robot 200 to move into region 208, close barrier door 112, and then open front door 114. While barrier door 112 is closed, the person may enter region 220 to access the slots in region 220. Also while barrier door 112 is closed, library 100 remains on-line, and the robot may continue to operate within region 208 to access the slots in region 208.

A user may also define a particular location within library 100 at which to close barrier door. When a particular location is defined, controller 118 will cause barrier door 112 to move to the particular location prior to closing barrier door 112. FIG. 3 depicts barrier door 112 being closed at a first location within library 100.

Figure 4:
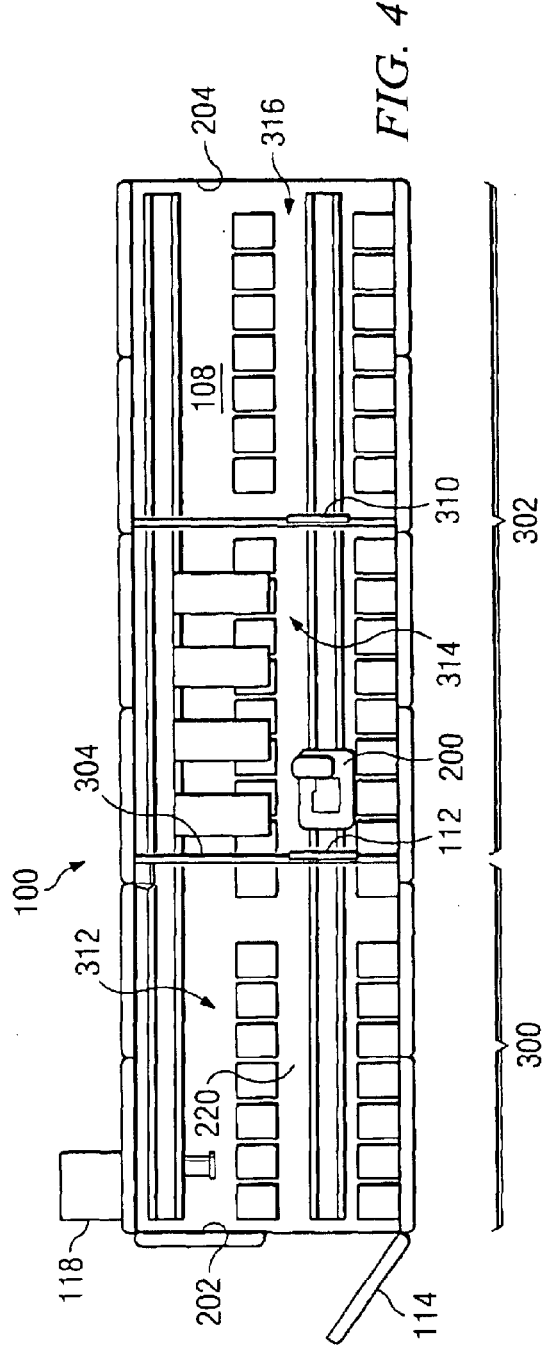
FIG. 4 is a top view of the data storage library of FIG. 1 having a barrier door in the closed position to define a load/unload area of a second size and including a second barrier door in accordance with the present invention.

FIG. 4 depicts a top view of the data storage library of FIG. 1 having a barrier door in the closed position to define a load/unload area of a second size in accordance with the present invention. FIG. 4 also depicts a second barrier door that may or may not be included within library 100.

When barrier door 112 is closed in a second location (as depicted by FIG. 4), interior region 108 is divided into a first region 300 and second region 302. Thus, load/unload area 220 is a second size. Load/unload area 220 is now defined between one end 202 of interior region 108 and barrier door 112. When barrier door 112 is closed, robot 200 may move within second interior region 302 between a new end 304 defined by barrier door 112 and end 204.

According to another embodiment, a second barrier door 310 may be included within library 100 for dividing interior 108 into additional regions. Barrier doors 112 and 310 are shown in their closed positions. When a second barrier door is included, barrier doors 112 and 310 thus create three regions, 312, 314, and 316, when they are closed. The present invention may be utilized to block robot 200 from entering regions 312 and 314 when both barrier doors are closed, or may be used to block robot 200 from only region 312, as depicted by FIG. 4. Alternatively, robot 200 may be confined within region 314 when both barrier doors are closed.

Figure 5:
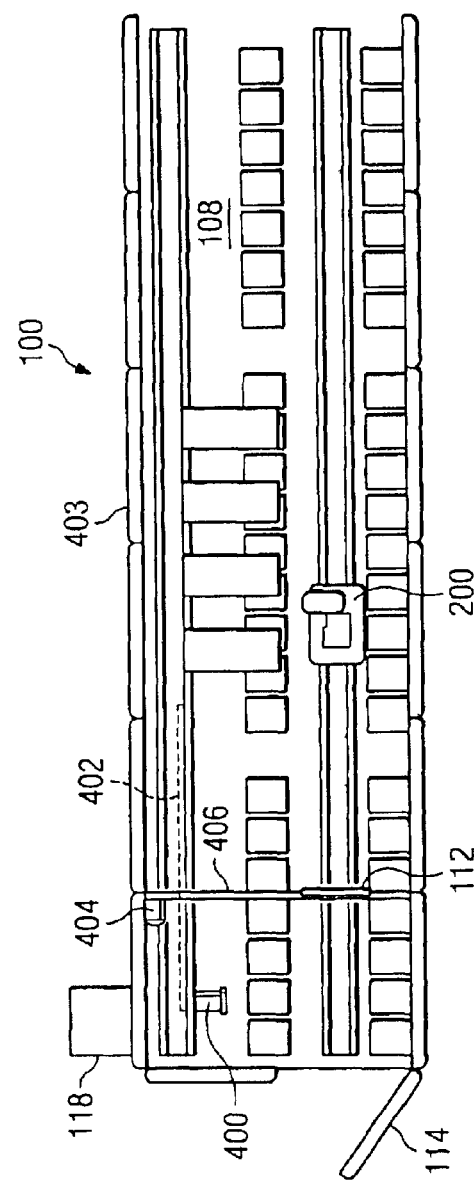
FIG. 5 is a partial top view of the data storage library of FIG. 1 depicting the barrier door movement mechanism in more detail in accordance with the present invention.

FIG. 5 is a partial top view of the data storage library of FIG. 1 depicting the barrier door movement mechanism in more detail in accordance with the present invention.

A first drive motor 400 provides mechanical power to move barrier door 112 along guide track 402 within interior region 108. In this manner, barrier door 112 may be moved parallel to a side 403 of housing 104 to any position within housing 104. A second drive motor 404 provides mechanical power to open and close barrier door 112 perpendicularly to side 403 along guide track 406. When a user specifies a location at which to close barrier door 112, motor 400 moves barrier door 112, while barrier door 112 is in its open position, horizontally through library 100 to the specified location. Once barrier door 112 arrives at the specified location, motor 404 then closes barrier door 112. The slots are positioned within library 100 in such a manner so that barrier door 112 may be moved while it is in its opened positioned horizontally along side wall 403.

Both doors 112 and 114 may be controlled by a user through library control unit 118 either directly or indirectly. A user may control a drive motor directly by entering specific motor control instructions into the library control unit 118. A user may control a motor indirectly by entering into the library control unit 118 a command to open front door 114. Another drive motor may be provided to automatically open and close front door 114. In response to a command to open front door 114 when three motors are provided, library control unit 118 will move barrier door 112 to the specified horizontal location within interior 108 using motor 404, and then close the barrier door 112 using motor 404 and open front door 114 using another motor (not shown).

The present invention may be implemented with any number of motors. A combination of motor and manual cranks may also be utilized.

Figure 6:
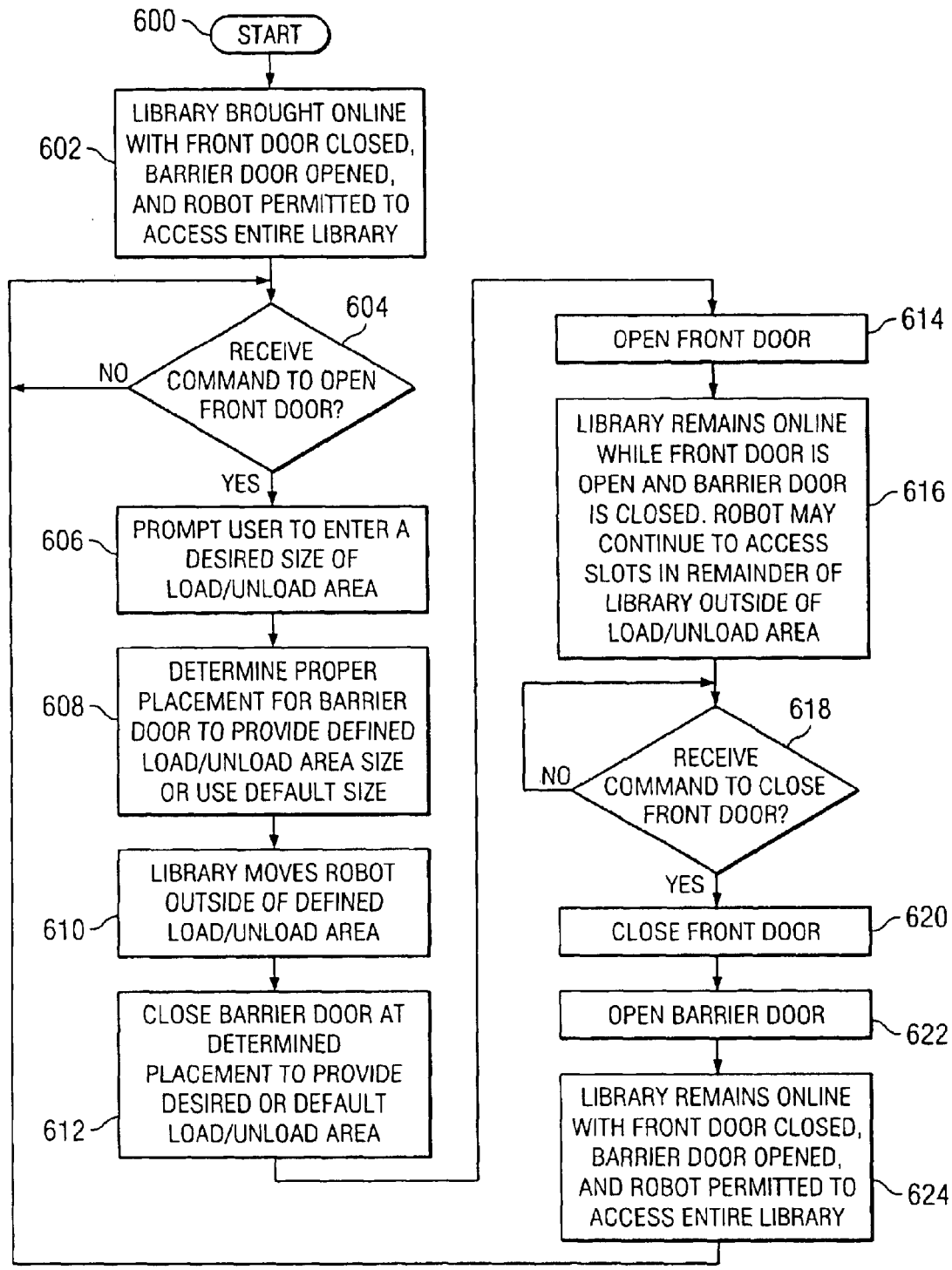
FIG. 6 illustrates a high level flow chart that depicts a process for providing a variable size load/unload area of a data storage library in accordance with the present invention.

FIG. 6 illustrates a high level flow chart that depicts a process for providing a variable size load/unload area of a data storage library in accordance with the present invention. The process starts as depicted by block 600 and thereafter passes to block 602 which illustrates the data storage library being brought online with the front door closed and the barrier door opened. The robot is permitted to access the entire interior region of the library when the front door is closed and the barrier door is opened. Next, block 604 depicts a determination of whether or not a command to open the front door has been received. If a determination is made that a command to open the front door has not been received, the process passes back to block 604. If a determination is made that a command to open the front door has been received, the process passes to block 606 which illustrates prompting a user to enter a desired size of a load/unload area. The user could specify a size by specifying a particular number of slots to be made accessible, specify a particular physical size for the area, or by specifying a particular location or a particular guide rail to use when closing the barrier door.

The process then passes to block 608 which depicts determining a placement location for closing the barrier door in order to create either the size specified by the user or a default size. Next, block 610 illustrates the library moving its robot outside of the defined load/unload area. Thereafter, block 612 depicts closing the barrier door at the determined placement location in order to create a load/unload area that is either the specified or default size. Thus, once the barrier door is closed, the interior region is divided into a first interior region that is the load/unload area, and a second interior region. The robot is located within the second interior region when the barrier door is closed.

The process then passes to block 614 which illustrates opening the front door. Next, block 616 depicts the library remaining online while the front door is open and the barrier door is closed. The robot may continue to access slots in the second interior region while the front door is open and the barrier door is closed. Block 618, then, illustrates a determination of whether or not a command to close the front door has been received. If a determination is made that a command to close the front door has not been received, the process passes back to block 618. If a determination is made that a command to close the front door has been received, the process passes to block 620 which depicts closing the front door. Next, block 622 illustrates opening the barrier door. Block 624, then, depicts the library remaining online with the front door closed, the barrier door opened, and the robot once again being permitted to access all of the interior region of the library. The process then passes back to block 604.

Figure 7:
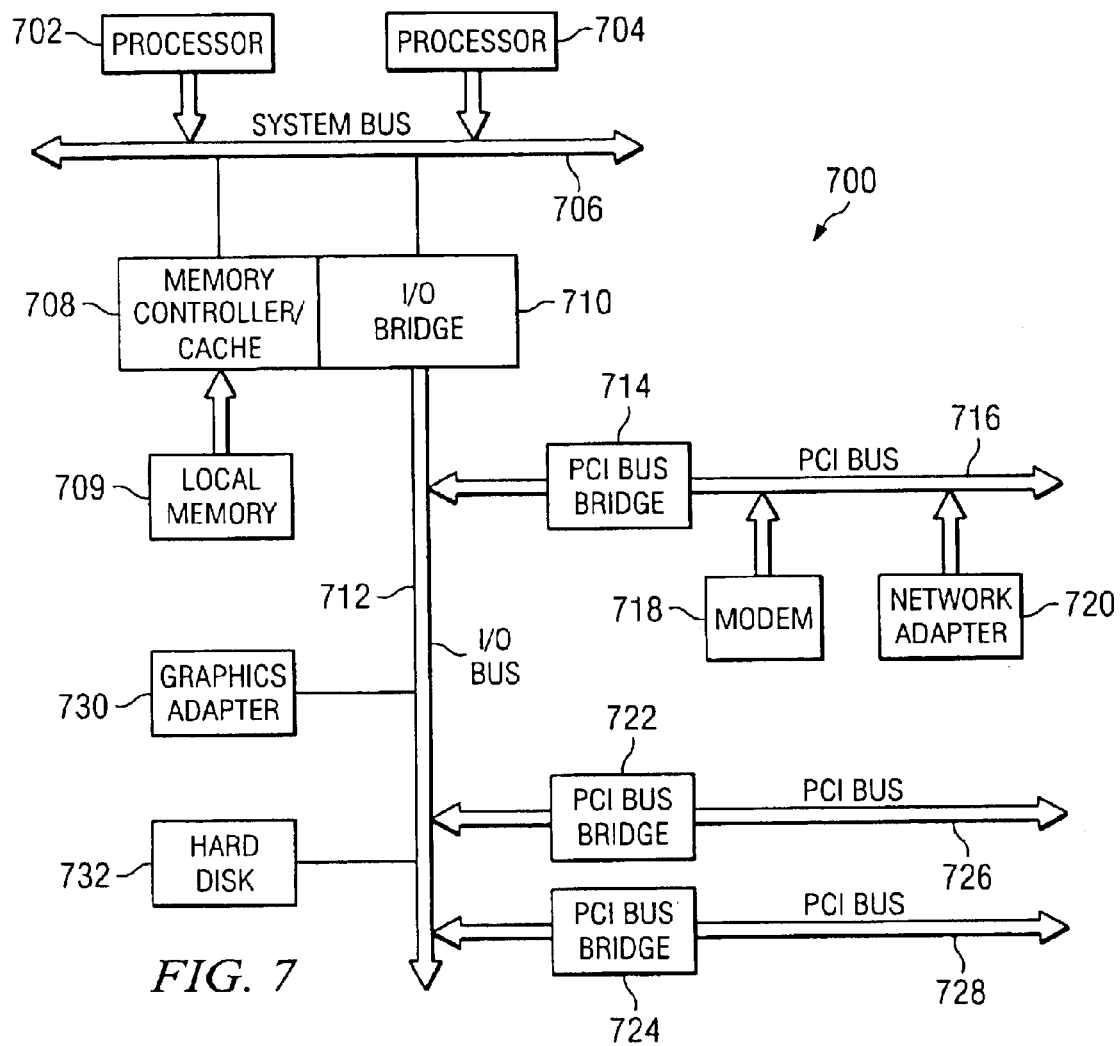
FIG. 7 depicts a block diagram of a computer system that may be used to implement a controller for the data storage library of FIG. 1 in accordance with the present invention.

FIG. 7 depicts a block diagram of a computer system that may be used to implement a controller for the data storage library of FIG. 1 in accordance with the present invention. Data processing system 700 may be a symmetric multiprocessor (SMP) system including a plurality of processors 702 and 704 connected to system bus 706. Alternatively, a single processor system may be employed. Also connected to system bus 706 is memory controller/cache 708, which provides an interface to local memory 709. I/O bus bridge 710 is connected to system bus 706 and provides an interface to I/O bus 712. Memory controller/cache 708 and I/O bus bridge 710 may be integrated as depicted.

Peripheral component interconnect (PCI) bus bridge 714 connected to I/O bus 712 provides an interface to PCI local bus 716. A number of modems may be connected to PCI bus 716. Typical PCI bus implementations will support four PCI expansion slots or add-in connectors.

Additional PCI bus bridges 722 and 724 provide interfaces for additional PCI buses 726 and 728, from which additional modems or network adapters may be supported. In this manner, data processing system 700 allows connections to multiple network computers. A memory-mapped graphics adapter 730 and hard disk 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data storage library comprising:

a housing defining an exterior and an interior region including a plurality of storage slots disposed in the interior region for storing data cartridges;

a barrier door disposed within said interior region, said barrier door having a closed position for dividing said interior region into a first interior region and a second interior region;

a controller for closing said barrier door prior to a front door being opened and for opening said barrier door after said front door is closed;

said front door permitting access to only said first interior region from said exterior region when said front door is opened, said first interior region being sized to permit a user to entirely physically enter said first interior region;

a robotic mechanism disposed in said interior region for accessing said plurality of storage slots when said library is online; and said library remaining online with said robotic mechanism being located within said second interior region when said front door is opened and said barrier door is closed.

2. The library according to claim 1, further comprising:

said plurality of data cartridges being stationary.

3. The library according to claim 1, further comprising:

when said barrier door is closed, a first plurality of said plurality of storage slots being included in said first interior region and a second plurality of said plurality of storage slots being included in said second interior region.

4. The library according to claim 1, further comprising:

said closed position of said barrier door being adjustable within said interior region to different horizontal locations between first and second interior end walls of said housing, said first and second interior end walls being horizontally disposed within said housing from one another.

5. The library according to claim 1, further comprising:

said controller for receiving a command to open said front door;

said controller for closing said barrier door in response to a receipt of said command to open said front door; and said controller for opening said front door after said barrier door is closed.

6. The library according to claim 5, further comprising:

said controller for receiving a command to close said front door;

said controller for closing said front door in response to a receipt of said command to close said front door; and said controller for opening said barrier door after said front door has closed.

7. The library according to claim 1, further comprising:

said closed position of said barrier door being adjustable within said interior region between first and second interior end walls of said housing;

said controller for receiving a command defining a size of said first interior region;

said controller for determining a location between said first and second interior end walls for placing said closed barrier door; and said controller for closing said barrier door at said location to create said first interior region that is said size.

8. The library according to claim 1, further comprising:

said front door prohibiting access to said interior region from said exterior region when said front door is closed.

9. The library according to claim 1, further comprising:

said barrier door having an open position wherein said interior region remains one region when said barrier door is open.

10. The library according to claim 1, further comprising:

said barrier door being disposed at a first location within said interior region; and a second barrier door disposed at a second location within said interior region, wherein said second barrier door has a closed position for dividing said second interior region into a third interior region and a fourth interior region, wherein said interior region is divided into three regions when said barrier door and said second barrier door are closed.

11. A method in a data storage library for creating a variable sized customer access port, said library having a plurality of stationary storage slots for storing data cartridges, a housing defining an exterior and an interior region, said library including a robotic mechanism, said method comprising:

receiving a command to open a front door;

prior to opening said front door:
moving said robotic mechanism to a first end of said interior region; and
closing a barrier door within said interior region to create a first interior region and a second interior region within said interior region, said barrier door dividing said interior region into said first and second interior regions when said barrier door is closed, said first end of said interior region being within said second interior region;

opening a front door to permit a user to entirely physically enter said first interior region;

accessing a first plurality of slots included within second interior region by said robotic mechanism while said barrier door is closed, said library remaining online while said barrier door is closed; and permitting a user to access a second plurality of slots that are included in said first interior region while said user is physically within said first interior region while said library remains online and said barrier door is closed.

12. The method according to claim 11, further comprising the steps of:

adjusting a horizontal position of said barrier door between said first end and a second end of said interior region, said first and second ends of said interior region being horizontally disposed from one another.

13. The method according to claim 11, further comprising the steps of:

receiving by a controller a command to open said front door;

closing said barrier door by said controller in response to a receipt of said command; and opening said front door by said controller only after said barrier door is closed.

14. The method according to claim 11, further comprising the steps of:

receiving by a controller a command to close said front door;

closing said front door by a controller in response to a receipt of said command;

opening said barrier door by a controller only after said front door is closed.

15. The method according to claim 11, further comprising the steps of:

said barrier door having a closed position and an open position;

receiving a command by a controller defining a first size of said first interior region;

determining a horizontal location within said interior region for placing said closed barrier door that will create said first interior region of said first size;

moving said barrier door to said location; and closing said barrier door at said location.

16. The method according to claim 15, further comprising the step of:

moving said barrier door while said barrier door is in its open position to said location.

17. The method according to claim 11, further comprising the steps of:

prohibiting access by said front door to said interior region from said exterior region when said front door is closed.

18. The method according to claim 11, further comprising the steps of:

prohibiting access by said barrier door to said second interior region from said first interior region when said barrier door is closed.

* * * * *